United States Patent Office 2,759,882
Patented Aug. 21, 1956

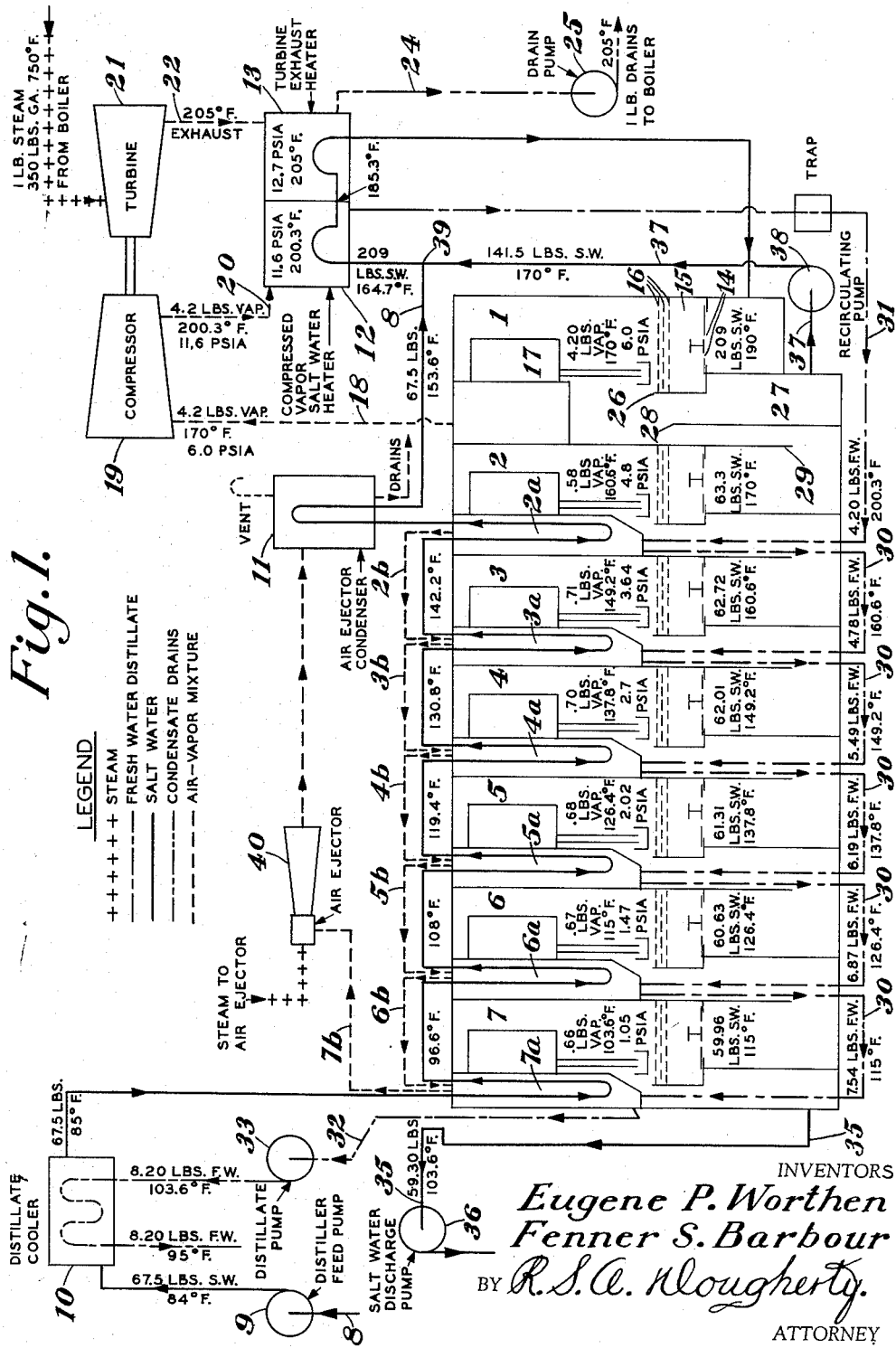

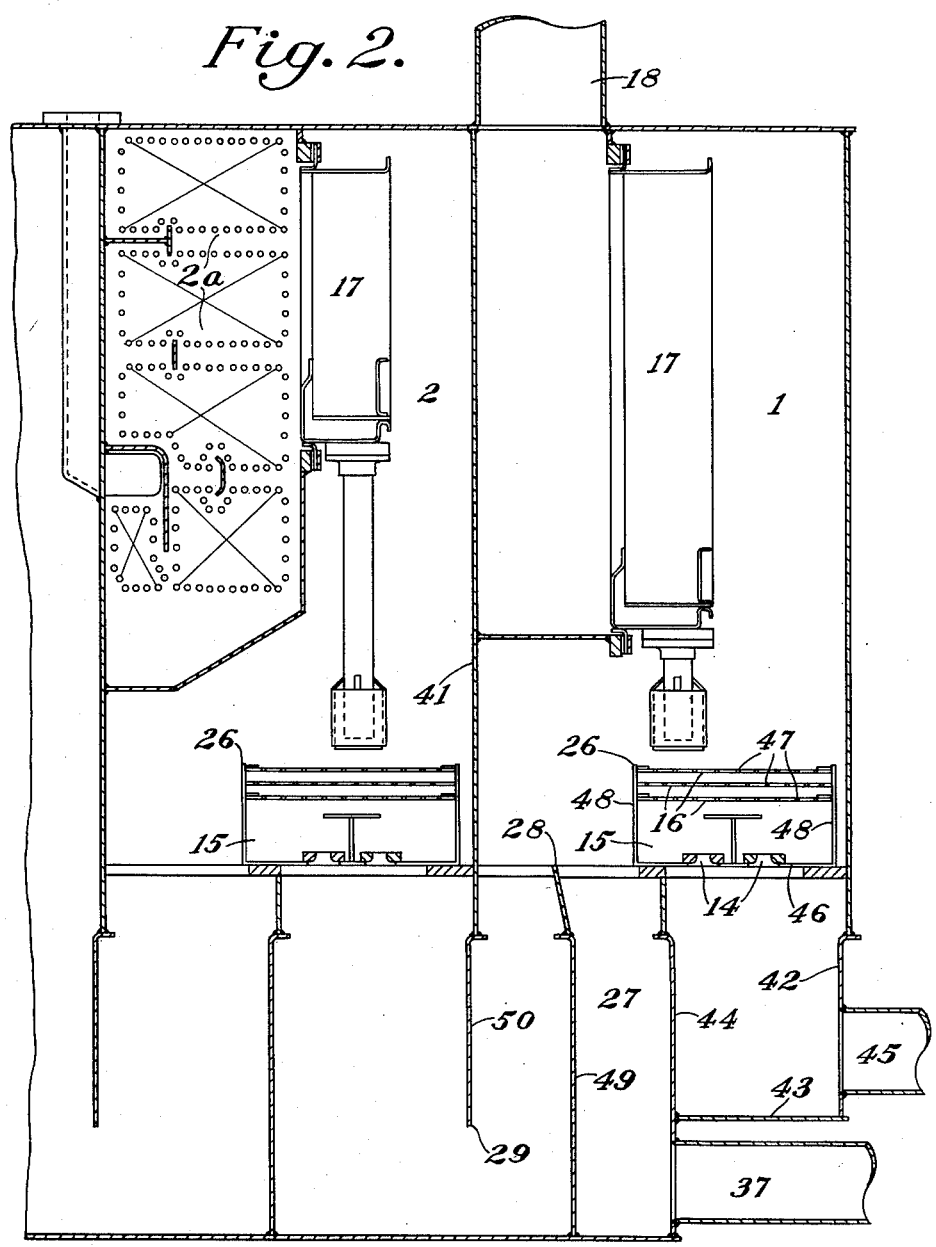

2,759,882

COMBINED FLASH AND VAPOR COMPRESSION EVAPORATOR

Eugene Porter Worthen, Braintree, and Fenner Smith Barbour, Wollaston, Mass., assignors to Bethlehem Steel Company, a corporation of Pennsylvania Application July 30, 1954, Serial No. 446,788

9 Claims. (Cl. 202—45)

This invention relates to an improved apparatus and method for evaporating and distilling, particularly adapted for producing fresh water from salt water.

An object of the invention is to provide an evaporator of the multi-stage flash type, in which vapor evolved in the first stage is compressed and the heat of the compressed vapor is used to impart heat to the feed-water entering the first stage by out of contact heat exchange.

Another object is to provide an evaporator of the combined vapor compression type and multi-stage flash type, having characteristics not possessed by either type alone.

Another object is to provide an evaporator of the combined vapor compression type and multi-stage flash type, in which provision is made for recirculation of a portion of the water not evaporated in the first stage.

Other objects will appear from the following description and claims.

The combination of the multistage flash principle of evaporation with the vapor compression principle of evaporation, each in itself a highly efficient process results in a distilling unit of extremely high efficiency, having a fresh water to oil ratio of better than 100 and a fresh water to steam ratio of better than 8. It is a well known fact that the multistage flash evaporator requires an external heater in which the feed water is heated, by means of steam, from the temperature at which it leaves the first stage condenser to a suitable higher temperature before it is flashed in the first stage. This heater is generally known as the salt water heater or evaporator feed heater. It is a further well known fact that any form of vapor compression evaporator, either of the flash or submerged tube type, requires for its efficient operation an effective brine and distillate cooler to recover the heat in the outgoing brine and condensate and transfer it to the incoming feed. In the past, this brine cooler has been a constant source of trouble due to scale formation. By combining the flash and vapor compression distillation cycles, in the manner hereinafter described, we have employed the vapor compression evaporator as a feed heater for the multistage flash evaporator and the flash evaporator as a brine and distillate cooler for the vapor compression evaporator.

In the accompanying drawings, Fig. 1 is a diagrammatic drawing of the improved evaporator, showing a typical flow sheet and heat balance, and Fig. 2 is a drawing of an improved evaporating chamber and weir for carrying out the invention.

The manner in which the flash and vapor compression systems are combined is shown in the accompanying Fig. 1, in which reference numerals 1, 2, 3, 4, 5, 6 and 7 represent the several evaporating chambers of a multistage flash evaporator. Salt water enters the system through conduit 8 and is circulated by means of pump 9 through distillate cooler 10 and then successively through the condensers 7a, 6a, 5a, 4a, 3a, and 2a of the flash chambers 7, 6, 5, 4, 3 and 2 respectively. During its passage therethrough the temperature of the salt water is raised by the heat of the condensing vapors.

Salt water leaving condenser 2a, passes through air ejector condenser 11 and through the compressed vapor salt water heater 12 and turbine exhaust heater 13, where its temperature is further raised to a suitable temperature for flashing in flash chamber 1, by out of contact heat exchange with vapors from the vapor compressor and turbine to be described below.

Salt water leaving the turbine exhaust heater 13 enters flash chamber 1 where a portion of it flashes into vapor through the orifices 14 of the flash box 15. The vapor passes through perforated horizontal plates 16, where a portion of the water droplets therein is removed and thence through the vapor separator 17 where additional moisture is removed therefrom. The vapor thus freed of water is drawn off through conduit 18 into compressor 19 where it is compressed and thereby further heated. The compressed and heated vapor passes through conduit 20 into the compressed vapor salt water heater 12 and gives up its heat to the salt water.

The compressor 19 is driven by turbine 21 which in turn is driven by steam from a boiler (not shown). Exhaust steam from the turbine passes through conduit 22 into the turbine exhaust heater 13 where it gives up its heat to the feedwater. The condensate is withdrawn through conduit 24 and pump 25 to the boiler.

Reverting to the flash chamber 1, salt water which is not vaporized therein overflows the weir 26 formed by one edge of the flash box 15 and enters the chamber 27. A portion of this unvaporized salt water is withdrawn from chamber 27, as described below while the remainder flows over a second weir 28, through the loop seal 29 and into the second stage flash chamber 2, which is maintained at a lower pressure than flash chamber 1 and where a further part of the salt is flashed into vapor in the same manner as in the flash chamber 1. This vapor is condensed in condenser 2a. The unflashed salt water passes through successively into flash chambers 3, 4, 5, 6 and 7, which are maintained at successively lower pressures, and in each of which it is further vaporized. The vapors formed in said chambers are condensed in condensers 3a, 4a, 5a, 6a and 7a. Condensate formed in each condenser flows through conduit 30 into the next succeeding condenser where it mingles with the condensate formed in the latter condenser. Condensate formed in the compressed vapor salt water heater flows through conduit 31 into condenser 2a. Condensate formed in the compressed vapor salt water heater and in condensers 2a through 7a is discharged from condenser 7a as fresh water through conduit 32, distillate pump 33 and distillate cooler 10.

The part of the feedwater remaining unflashed in chamber 7a is discharged to waste through conduit 35 and salt water discharge pump 36.

An essential feature of this system is that a portion of the unevaporated feedwater discharged from chamber 1 is returned through conduit 37 and pump 38 to conduit 8 where it joins at point 39 the feedwater flowing from the condenser 2a through conduit 8 into compressed vapor salt water heater 12. By means of this recirculation of feed, the amount of which can be varied, the system can be kept in proper balance, as will be explained below.

Each of the condensers 2a, 3a, 4a, 5a and 6a is vented into the next succeeding condenser through vents 2b, 3b, 4b, 5b and 6b. Condenser 7a is vented through vent 7b to air ejector 40, the discharge from which is condensed in air ejector condenser 11.

Fig. 2 discloses in greater detail than Fig. 1 the construction of the evaporator and particularly the means for controlling the disposition of the effluent from the first stage of the evaporator.

In Fig. 2, the first and second stage evaporating chambers are designated by the numerals 1 and 2 and are separated by the common wall 41.

Within chamber 1, flash box 15 is provided with sidewalls 48 which form an overflow weir 26 for feedwater fed thereto.

Below the flash chamber 1 is the feedwater inlet box formed by plates 42, 43 and 44. Feedwater enters said box through feedwater inlet 45 and rises through orifices 14 in the plate 46 forming the bottom of the flash box 15 where a portion of the feedwater flashes into vapor. The vapor passes through perforations 47 in the horizontal plates 16 and through the head of water in the flash box 15, whereby a portion of the water droplets contained in the vapor is removed therefrom. From there the vapor rises through the vapor separator 17 where additional moisture is removed thereupon. The vapor thus freed of moisture is drawn off through conduit 18 leading to the vapor compressor (see Fig. 1).

Spaced laterally between the wall 44 of the inlet box and the common wall 41 between the flash chambers 1 and 2 is the wall 49 which forms a second overflow weir 28. Feedwater unevaporated in flash chamber 1 overflows weir 26 of flash box 15 and enters chamber 27 formed by walls 49 and 44. A portion of this feedwater is withdrawn from chamber 27 through conduit 37, while the remainder overflows weir 28 into the loop seal 29 formed by the wall 49 and the wall 50, which is a downward extension of the wall 41 separating flash chambers 1 and 2. The feedwater flowing through loop seal 29 is further evaporated in flash chamber 2 and in the succeeding flash chambers in the manner hereinabove described.

The amount of water withdrawn from chamber 27 and recirculated, and thus the amount of water overflowing the weir 28 and passing through the remaining flash chambers, can be controlled and varied by means of recirculating pump 38.

The system will now be described in connection with an assumed set of conditions. The figures given below are approximate.

Forming part of Fig. 1 is a typical heat flow diagram of a combined flash and vapor compression evaporator cycle calculated for 350 p. s. i. g. steam pressure, 750° F. total temperature steam supply, and 84° F. sea water temperature conditions. All quantities are based on 1# of steam supplied to the cycle. Approximately 8.2# of fresh water per pound of steam, or 115# of fresh water per pound of oil, are produced (assuming a boiler efficiency of 88%, a turbine efficiency of 80% and a compressor efficiency of 85%).

Approximately 67.5# of salt water feed at 84° F. flows in succession through the distillate cooler 10 and through the tubes of the vapor condensers 7a through 2a inclusive and air ejector condenser. The flash vapor in each of these stages is condensed on the tube of the vapor condensers and gives up its latent heat to the salt water feed which, in turn, is heated to 153.6° F. at the outlet of the air ejector condenser. At point 39 in the cycle the feed is joined by 141.5# of salt water at 170° F. recirculated from the first stage. The combined flow, 209# at 164.7° F., passes in succession through the tubes of the compressed vapor salt water heater 12 and the turbine exhaust heater 13 where it absorbs the heat of condensation of the compressed vapor and the turbine exhaust and increases in temperature to 190° F.

The combined flow at 190° F. then enters the first stage which is at a pressure of 6 p. s. i. a. and a temperature of 170° F. The entering salt water in reducing to this pressure and temperature releases 4.2# of flash vapor which passes through a vapor separator where entrained moisture is removed and enters the suction of the vapor compressor. It is compressed to 11.6 p. s. i. a. and 200.3° F. and discharged to the compressed vapor salt water heater where it condenses and transfers its heat of condensation to the incoming salt water. The resulting 4.2# of condensate which is part of the fresh water product then flows in succession through the various stage condensers where it mixes with the condensate produced in those stages and finally emerges from the seventh stage condenser.

Of the unflashed salt water remaining in the first stage 141.5# is recirculated as previously described and 63.3# passes successively through stages two through seven inclusive in each of which further flash vaporization takes place. The vapor flashed in each of these stages is condensed in its associated stage condenser. The resulting condensate flows in succession through the remaining condensers to the seventh stage where the total condensate (8.20#) is removed by a distillate pump and becomes the fresh water product. The unflashed salt water, 59.30#, is removed by the salt water overboard pump from the seventh stage and discharged to waste.

Several methods of removing air and non-condensible gases from the system are possible. For example, each of the stage condensers as well as the two heaters may be vented to the seventh stage condenser and the gases removed from the seventh stage condenser by means of an air ejector.

From the foregoing, it can be seen that of the 67.5 lbs. of feed water at 153.6° F. delivered from the air ejector condenser, 63.3 lbs. are returned to the second stage flash chamber at 170° F. while 4.2 lbs. are flashed to fresh water, condensed and returned at 200.3° F. To accomplish this a pound of steam is required by the turbo-compressor. Had this steam been used in a conventional evaporator feed water heater (salt water heater), it would have heated the feed to approximately the required 170° F. but no additional fresh water would have been produced. Therefore, by the substitution of a vapor compression component for the conventional salt water heater approximately 4.2 lbs. of additional fresh water are obtained per pound of primary steam. Since the remaining six stages of flash evaporation produce 4 lbs. of fresh water, the total fresh water produced per pound of steam is approximately doubled to 8.2 lbs. This gives a steam to fresh water ratio of 0.122.

Recirculation of a portion of the salt water from the first stage through the compressed vapor salt water heater and the turbine exhaust condenser allows the production of approximately one-half of the total fresh water in the vapor compression portion of the cycle without exceeding a maximum salt water temperature of 190° F. It also reduces the pressure differential against which the vapor compressor must work thereby increasing the quantity of vapor that can be compressed for a given power input. This, in turn, improves the efficiency of the cycle.

The advantage of combining the flash evaporation and vapor compression principles arises from the fact that it permits attaining an economy in seven stages with a maximum salt water temperature of 190° F. which would require eleven or twelve stages and a maximum salt water temperature of approximately 270° F. with a straight flash evaporator cycle. Such a high salt water temperature would create a difficult scaling problem.

The temperatures and pressures in the vapor compression part of the cycle are selected on the basis of both thermal and economic considerations. In the example given above, the six stage flash component of the plant (stages 2 to 7 of Fig. 1) requires a salt water feed temperature of 170° F. This determines the temperature in the flash chamber of the vapor compression part of the cycle (first stage flash chamber). The temperature and pressure to which the vapor is compressed is determined by economic considerations of efficiency as well as size and cost of the various components. As the temperature and pressure are increased, the work of compression also increases and the overall efficiency of the unit decreases. On the other hand a low compression ratio results in a smaller output for the same amount of salt water circulated, larger heating surfaces and a generally larger plant for the same capacity. In the cycle shown in Fig. 1, a compression ratio resulting in a vapor temperature rise of 30° F. and a total feed flash of 20° F., from 190° F. to 170° F., was selected. On the basis of one pound of motive steam to the turbine, the compressor will pump 4.2 lbs. of vapor between the limits chosen, i. e., from 6.0 p. s. i. a. to 11.6 p. s. i. a. The heat of condensation of this vapor plus the heat of condensation of the turbine exhaust steam must heat the feed to 190° F. Sufficient feed at 170° F. is, therefore, recirculated to maintain the feed entering the first-stage flash chamber at a temperature of about 190° F. It is the use of recirculation in the vapor compression component of the cycle that permits the multi-stage flash unit and the vapor compression flash unit to be combined. By varying the amount of recirculation, changes in the efficiency of the compressor and variations in the temperature of the feed coming from the multi-stage flash component of the plant can be compensated for, the feed entering the first stage flash chamber can be maintained at 190° F., and the output of the cycle can be held substantially constant.

Without recirculation the flash and vapor compression cycles could not be combined since there is insufficient feed coming from the second stage of the flash cycle to condense the compressed vapor and turbine exhaust steam without a prohibitive rise in condensing temperature and pressure. This rise in condensing pressure would raise the compression ratio against which the compressor must operate, which in turn would increase the power required from the turbine which would still further raise the pressure and temperature in the turbine exhaust and compressed vapor salt water heaters to the point where the cycle becomes unworkable. The principle of recirculation is the means by which the requirements of the vapor compression cycle are matched to those of the multistage flash cycle.

While the cycle described above employs seven stages of flash evaporation plus vapor compression, a number of variations are possible depending upon specific conditions. For instance the number of stages, the vapor compression ratio, the maximum salt water temperature and the amount of salt water recirculated all may be varied. Choice of a particular cycle of this type in each instance will depend upon an analysis of such factors as the relation of fixed charges for plant and equipment to labor and fuel costs.

The compressor could be operated by other means than steam i. e. by electrical or diesel power. Less recirculation would be required since the turbine exhaust and its latent heat would be eliminated from the cycle. The output for a given compressor power input would be reduced. Overall economy would probably be less but would in the last analysis depend on an accurate heat balance and evaluation of the relative cost of the different power sources. If diesel power were used, the heat in the diesel engine jacket water could be added to the evaporator cycle by means of a heat exchanger located in the same point in the cycle as the turbine exhaust salt water heater.

Although the evaporator has been described in connection with the production of fresh water from salt water, it is adapted to the evaporation of other liquids as well.

We claim:

1. An evaporator comprising a first flash chamber and a second flash chamber, means for compressing vapors produced in the first chamber, a first heat exchanger wherein said compressed vapors are condensed, a second heat exchanger wherein vapors produced in the second chamber are condensed, a conduit for conducting feed water successively through said second heat exchanger and said first heat exchanger and into said first flash chamber, a conduit for leading a portion of the feed water not vaporized in said first flash chamber into said second flash chamber, a conduit for leading the remainder of said unvaporized feed water into said first heat exchanger.

2. Apparatus for evaporating a liquid comprising a plurality of flash chambers in series from a first to a last one thereof, a condenser for each flash chamber except the first, means for compressing vapors produced in said first flash chamber, a condenser for condensing said compressed vapors, means for conducting feed water through said condensers successively from the last to the first thence through said compressed vapor condenser and thence into said first flash chamber, means for conducting unevaporated feed water from each flash chamber to the next succeeding flash chamber, and means for conducting a portion of the unevaporated feed water from the first flash chamber to the inlet of said last mentioned condenser, and means for conducting the remainder of the unevaporated feed water from the first flash chamber successively through the remaining flash chambers.

3. Apparatus for evaporating a liquid, comprising a flash evaporator having a plurality of flash chambers from a first one to a last one thereof, a flash chamber condenser associated with each of said flash chambers except the first, means for conducting feed water in out of contact heat exchange relationship through said condensers, means for compressing vapor produced in said first stage, a steam operated prime mover for said compressing means, means for supplying steam to said prime mover, a vapor condenser for condensing vapors compressed in said compressing means, a steam condenser for condensing exhaust steam from said prime mover, means for conducting feed water in out of contact heat exchange relationship successively through said flash chamber condenser, said vapor condenser and said steam condenser and thence into said first flash chamber, means for recirculating a portion of the feed water not evaporated in said first chamber through said vapor condenser and said steam condenser, and means for conducting the residue of said unevaporated feed water successively through the remainder of said flash chambers.

4. Apparatus for evaporating and distilling, comprising a first flash chamber and a second flash chamber, means for maintaining said chambers at successively lower, sub-atmospheric pressures, a condenser for vapors evolved in said second flash chamber, a compressor for vapors evolved in said first flash chamber, a vapor condenser for condensing vapors compressed in said compressor, a steam-driven prime mover for said compressor, a steam condenser for condensing exhaust steam from said prime mover, a conduit for conducting feed water successively through the condenser for said second flash chamber, said compressed vapor condenser and said exhaust steam condenser in out of contact heat exchange relationship with the vapors therein and thence into said first flash chamber, a conduit for conducting a portion of the unvaporized feed water (effluent) from said flash chamber to the inlet end of said compressed vapor condenser, and a conduit for conducting the remainder of the unevaporated feed water (effluent) from said first flash chamber to said second flash chamber.

5. Apparatus for evaporating, comprising a first flash chamber and a second flash chamber, a first condenser for condensing vapors produced in said second flash chamber, a compressor for compressing vapors produced in said first flash chamber, a second condenser for condensing vapors compressed in said compressor, a steam driven prime mover for said compressor, a third condenser for condensing exhaust steam from said prime mover, means for conducting feed water successively through said first condenser, said second condenser and said third condenser to heat the same by out of contact heat exchange with the vapors therein, means for conducting said heated feed water into said first flash chamber, means for recirculating a portion of the effluent from said first flash chamber through said second condenser and said third condenser, means for varying the amount of recirculated effluent, and means for conducting the remainder of the effluent from said first flash chamber into said second flash chamber.

6. An evaporator including a first evaporating chamber and a second evaporating chamber, a first weir contained within said first chamber forming an overflow means for the effluent from said chamber, a second weir contained within said chamber spaced outwardly from said first weir, and forming therewith a container for said effluent, means for withdrawing effluent from said container and a passage for conducting effluent overflowing said second weir to said second evaporating chamber.

7. A flash evaporator including a first flash chamber and a second flash chamber, a container in said first chamber for the distilland, said container including an overflow weir for the effluent from said container, said weir being spaced from a wall of said flash chamber, a second overflow weir in said first flash chamber located between said first weir and said wall, means for withdrawing effluent from the space between said weirs and a passage opening into the wall of said chamber at the lower end thereof for conducting the effluent of the second weir to the second flash chamber.

8. Method of evaporating comprising vaporizing heated feed water in a first flash chamber, compressing the vapor evolved in said first flash chamber, supplying said compressed vapor to a compressed vapor condenser, supplying a portion of the feed water unevaporated in said first flash chamber to said compressed vapor condenser for out of contact heat exchange with vapors in said compressed vapor condenser, supplying the remainder of said feed water unevaporated in said first flash chamber to a second flash chamber for flash evaporation therein, supplying the vapor evolved in said second flash chamber to a flash chamber condenser, heating fresh feed water by out of contact heat exchange with vapors in said flash chamber condenser and said compressed vapor condenser successively, and supplying the fresh feed water and the said portion of unevaporated feed water, both of which have been heated in said compressed vapor condenser, to said first flash chamber for vaporization therein.

9. Method of evaporating comprising vaporizing heated feed water in a first flash chamber, compressing the vapor evolved in said first flash chamber, supplying said compressed vapor to a compressed vapor condenser, supplying a portion of the feed water unevaporated in said first flash chamber to said compressed vapor condenser for out of contact heat exchange with vapors in said compressed vapor condenser, supplying the remainder of said feed water unevaporated in said first flash chamber to a plurality of flash chambers in succession, supplying the vapor evolved in said flash chambers to a plurality of associated flash chamber condensers, heating fresh feed water by out of contact heat exchange with vapors in said flash chamber condenser and in said compressed vapor condenser successively, and supplying the fresh feed water and the said portion of unevaporated feed water, both of which have been heated in said compressed vapor condenser, to said first flash chamber for vaporization therein.

References Cited in the file of this patent

UNITED STATES PATENTS

| | | |
|---|---|---|
| 643,702 | Waterhouse | Feb. 20, 1900 |
| 2,185,595 | Kleinschmidt | Jan. 2, 1940 |
| 2,324,663 | Aiton | July 20, 1943 |
| 2,398,068 | Worthen et al. | Apr. 9, 1946 |
| 2,440,173 | Henszey | Apr. 20, 1948 |
| 2,487,884 | Lunt | Nov. 15, 1949 |
| 2,613,177 | Worthen et al. | Oct. 7, 1952 |
| 2,696,465 | Kittredge | Dec. 7, 1954 |